United States Patent
Mertens

(10) Patent No.: US 6,272,421 B1
(45) Date of Patent: Aug. 7, 2001

(54) ANTILOCK BRAKING SYSTEM, BASED ON A FUZZY CONTROLLER, FOR AN ELECTROMECHANICAL VEHICLE BRAKING SYSTEM

(75) Inventor: Anno Mertens, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/391,040

(22) Filed: Sep. 7, 1999

(30) Foreign Application Priority Data

Sep. 7, 1998 (DE) .............................. 198 40 826

(51) Int. Cl.[7] ..................................................... B60T 8/62
(52) U.S. Cl. ................................................................ 701/77
(58) Field of Search ....................... 701/77, 78; 303/155

(56) References Cited

U.S. PATENT DOCUMENTS

| | | |
|---|---|---|
| 4,842,342 | 6/1989 | Takahashi et al. . |
| 5,001,640 | 3/1991 | Matsumoto et al. . |
| 5,409,302 | 4/1995 | Chabbert . |
| 5,416,709 * | 5/1995 | Yeh et al. .............................. 701/77 |

FOREIGN PATENT DOCUMENTS 0 585 134 A2   3/1994  (EP) .

* cited by examiner

*Primary Examiner*—Michael J. Zanelli
(74) *Attorney, Agent, or Firm*—Herbert L. Lerner; Laurence A. Greenberg; Werner H. Stemer

(57) ABSTRACT

The subject of the application has a fuzzy controller which forms a pressure rate of change as a function of a wheel slip, a wheel acceleration, a locking pressure and a ratio between the actual pressure and the locking pressure. The rate of change is supplied, via an integrating unit, to an actuator of an electromechanical braking system. The locking pressure can thereby be adapted dynamically as a function of the wheel slip. Optimal antilock braking control for electromechanical braking systems is achieved through the selection of the input and output variables and the rule base.

6 Claims, 1 Drawing Sheet

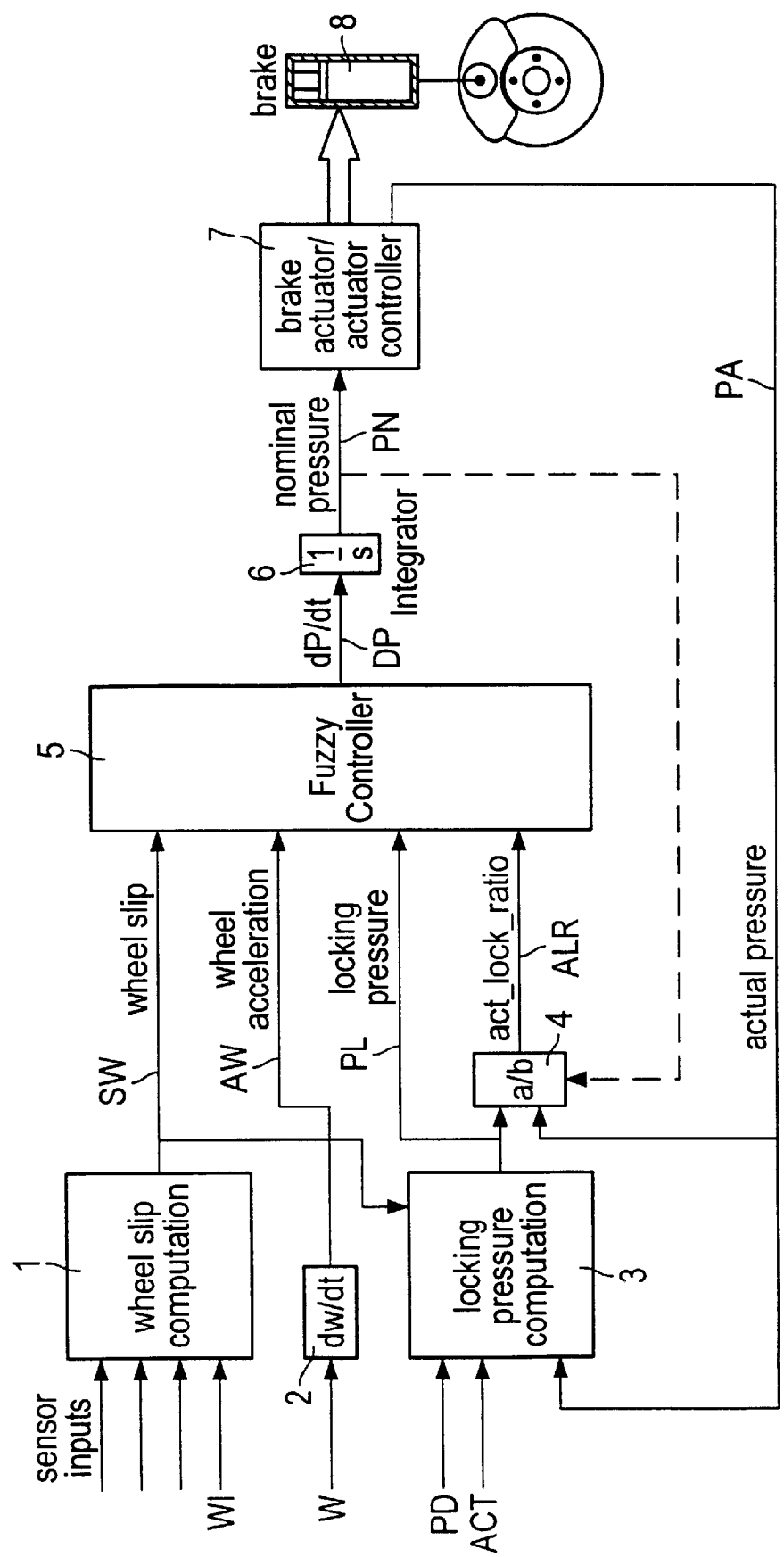

ANTILOCK BRAKING SYSTEM, BASED ON A FUZZY CONTROLLER, FOR AN ELECTROMECHANICAL VEHICLE BRAKING SYSTEM

BACKGROUND OF THE INVENTION

Field of the Invention

This invention lies in the automotive arts. Specifically, the invention pertains to an antilock braking system, in which an actuator in a braking system is controlled using a number of speed values and pressure values, with the aid of a fuzzy controller.

New requirements in the braking functions, and the requirement to reduce the assembly and maintenance costs, lead to new braking systems in which the force is no longer produced by a braking-torque requirement which originates from the driver and is transmitted directly as a force via a hydraulic system. Instead, an electromechanical brake actuator is controlled with the aid of an electric signal and produces a frictional force on a brake by means of an electrical power supply. This recent advance is generally referred to as a brake-by-wire braking system. Even in such an electromechanical braking system, a device is expedient which prevents the locking of a braked wheel and thus maintains the driving stability of the braked wheel. For this purpose, wheel-speed sensor devices for each wheel or for each group of wheels, and electric, continuously setting braking-pressure or braking-force actuators, which can set an independent braking pressure or an independent braking force for each wheel or for each wheel group, are needed.

Each wheel has an associated wheel-speed sensor which transmits a wheel-speed signal to the computing unit and the control unit. These wheel speeds are used in a conventional computation of the wheel slip in that, for example, a vehicle reference speed is determined from the quickest, non-driven wheel, taking into account steering lock. The slip of a wheel is calculated from the ratio between the measured wheel speed and the vehicle reference speed. If the reference brake pressure requested by the driver exceeds a specific value, which depends on the roadway surface, the affected wheel would lock. This is undesirable, for obvious reasons. It is therefore necessary for the reference pressure to be reduced such that locking of the wheel no longer takes place.

U.S. Pat. No. 4,842,342 to Takahashi et al. discloses an ABS system based on a fuzzy controller, in which the braking force of a hydraulic braking system is controlled from wheel speed values and vehicle acceleration values, with the aid of a fuzzy controller.

U.S. Pat. No. 5,001,640 to Matsumoto et al. discloses an antilock braking system based on a fuzzy controller in which, in addition to speed values, the hydraulic pressure required by an electronic control unit is used to control the braking pressure.

The prior art systems of this generic type are generally complicated and require considerable outlay in computing power and electromechanical control systems.

SUMMARY OF THE INVENTION

It is accordingly an object of the invention to provide a fuzzy-logic controlled antilock braking system for an electromechanical braking system, which overcomes the above-mentioned disadvantages of the heretofore-known devices and methods of this general type and which achieves largely optimal ABS regulation with the lowest possible outlay and with a relatively simple rule base.

With the foregoing and other objects in view there is provided, in accordance with the invention, a fuzzy-logic controlled antilock system for an electromechanical vehicle braking system, comprising:

a fuzzy controller adapted to form a braking-pressure rate of change; and a unit with integral behavior connected to the fuzzy controller, the unit with integral behavior utilizing the braking-pressure rate of change to output a nominal braking pressure as input variable for the vehicle braking system, and a signal connection between the vehicle braking system and an input upstream of the fuzzy controller whereby the vehicle braking system supplies an actual braking pressure as a comparative variable.

In accordance with an added feature of the invention, the fuzzy controller is adapted to form the braking-pressure rate of change as a function of a wheel slip, a wheel acceleration, a locking pressure and a pressure ratio between the actual a braking pressure or a nominal pressure and the locking pressure.

In accordance with an additional feature of the invention, there is provided a unit for calculating the locking pressure, whereby the actual pressure is in each case stored as the locking pressure when the wheel slip exceeds a specific threshold value.

In accordance with another feature of the invention, the fuzzy controller has a rule base defining the positive pressure rate of change to be lower the closer the pressure ratio is to one.

In accordance with a further feature of the invention, the fuzzy controller has a rule base defining the braking-pressure rate of change to depend only on the wheel acceleration and the pressure ratio, on the proviso that the wheel slip is judged to be in order.

In accordance with a concomitant feature of the invention, the rule base of the fuzzy controller is based on:

definitions for the wheel slip consisting only of the linguistic values "ok," "too small," "too large," and "much too large";

definitions for the wheel acceleration consisting only of the linguistic values "normal," "too negative" and "too positive";

definitions for the pressure ratio consisting only of the linguistic values "one," "greater than one," "small," "large," and "very large"; and definitions for the locking pressure consisting only of the linguistic values "small" and "large".

Other features which are considered as characteristic for the invention are set forth in the appended claims.

Although the invention is illustrated and described herein as embodied in an antilock braking system, based on a fuzzy controller, for an electromechanical vehicle braking system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing FIGURE.

BRIEF DESCRIPTION OF THE DRAWING

The sole drawing FIGURE is a diagrammatic illustration of an exemplary embodiment of an antilock braking system according to the invention for a single wheel.

DESCRIPTION OF THE PREFERRED EMBODIMENTS

A vehicle speed is calculated in a unit 1 for wheel slip computation, as mentioned above, for example from one of several wheel speeds WI and from this, in turn in conjunction with a speed W of the relevant wheel, a slip SW is calculated and fed to a fuzzy controller 5 and to a unit 3 for calculating a locking pressure PL. By means of a differential element, the wheel acceleration AW is determined from the wheel speed W, and likewise fed to the fuzzy controller 5. The unit 3 and a divider device 4 receive signals PA for the actual pressure from a unit 7, which comprises an electric brake actuator and an associated controller. A signal for a nominal pressure PN, which the electric brake 8 is intended to receive, is fed in at the input of the unit 7. The actual pressure PA present in the unit 7 is fed, with the aid of the signal, to the input of the unit 3 and to the divider device 4.

For example, at the beginning of a braking action, the unit 3 receives a starting value for a locking pressure in signals PD and ACT. The starting value may be, for example, the actual pressure PA at the beginning of the ABS braking action, that is to say at the time at which the ABS just becomes active. Depending on the slip values SW, the signal for the locking pressure PL in the unit 3 is updated in such a way that the signal PA for the actual pressure is always stored as the locking pressure when the slip SW exceeds a specific threshold value. It is thereby possible for the threshold value to be permanently defined or else to be tracked, for example by a dedicated controller. The dynamic adaptation of the locking pressure takes account, for example, of changes in the properties of the roadway or in the properties of the tires. The value for the locking pressure PL calculated in the unit 3 is fed both to the input of the fuzzy controller 5 and to the input of the divider unit 4. The latter forms a signal for a pressure ratio ALR and likewise feeds that signal to the input of the fuzzy controller.

In order to form the pressure ratio ALR, it is optionally possible, as indicated by the dashed line in the drawing, for the signal PN for the nominal pressure to be used for the actual pressure instead of the signal PA. With the aid of a fuzzy rule base, the fuzzy controller 5 produces, on the output side, a pressure rate of change DP, which is fed to an integrator unit 6 with an integral behavior and which forms the signal for the nominal pressure PN.

The following text illustrates, by way of example, such a fuzzy rule base, which links the input variables of the fuzzy controller to the output variable—the pressure rate of change DP—in the form of IF-THEN rules:

1) If SW is ok then DP is zero.
2) If SW is ok and AW is too_neg and ALR is one then DP is m100.
3) If SW is ok and AW is too_neg and ALR is very_large then DP is m100.
4) If SW is ok and AW is too_neg and ALR is small then DP is m20.
5) If SW is ok and AW is too_pos then DP is 5.
6) If SW is ok and ALR is one then DP is 10.
7) If SW is too_small and ALR is one and PL is small then DP is 20.
8) If SW is too_small and ALR is larger_one and PL is small then DP is 100.
9) If SW is too_small and ALR is one and PL is large then DP is 10.
10) If SW is too_small and ALR is larger_one and PL is large then DP is 50.
11) If SW is too_large and ALR is larger_one then DP is m20.
12) If SW is much_too_large and ALR is larger one then DP is m20.
13) If SW is too_small and ALR is small and PL is large then DP is 100.
14) If SW is too_small and ALR is very_large and PL is large then DP is 10.
15) If SW is too_large and ALR is very_large and PL is large and AW is too_neg then DP is m300.
16) If SW is too_large and ALR is one and PL is large and AW is too_neg then DP is m300.
17) If SW is too_large and ALR is very_large and PL is large and AW is normal then DP is m50.
18) If SW is too_large and ALR is one and PL is large and AW is normal then DP is m50.
19) If SW is too_large and ALR is very_large and PL is large and AW is too_pos then DP is zero.
20) If SW is too_large and ALR is one and PL is large and AW is too_pos then DP is zero.
21) If SW is too large and ALR is small and PL is large then DP is m20.
22) If SW is much_too_large and ALR is one and PL is large then DP is m300.
23) If SW is much_too_large and ALR is very_large and PL is large then DP is m300.
24) If SW is much_too_large and ALR is small and PL is large and AW is normal then DP is m100.
25) If SW is much_too_large and ALR is small and PL is large and AW is too_neg then DP is m100.
26) If SW is much_too_large and ALR is small and PL is large and AW is too_pos then DP is zero.
27) If SW is too_small and ALR is small and PL is small then DP is 20.
28) If SW is too_small and ALR is large and PL is small then DP is 10.
29) If SW is too_small and ALR is very_large and PL is small then DP is 10.
30) If SW is too_large and ALR is very_large and PL is small and AW is too_neg then DP is m300.
31) If SW is too_large and ALR is one and PL is small and AW is too_neg then DP is m300.
32) If SW is too_large and ALR is very_large and.PL is small and AW is normal then DP is m10.
33) If SW is too_large and ALR is one and PL is small and AW is normal then DP is m10.
34) If SW is too_large and ALR is very_large and PL is small and AW is too_pos then DP is zero.
35) If SW is too_large and ALR is one and PL is small and AW is too_pos then DP is zero.
36) If SW is too_large and ALR is small and PL is small then DP is m10.
37) If SW is much_too_large and ALR is one and PL is small then DP is m100.
38) If SW is much_too_large and ALR is very_large and PL is small then DP is m100.
39) If SW is much_too_large and ALR is small and PL is small and AW is normal then DP is m10.
40) If SW is much_too_large and ALR is small and PL is small and AW is_too_neg then DP is m20.
41) If SW is much_too_large and ALR is_small and PL is small and AW is too_pos then DP is zero.

There exist four linguistic values for the slip SW, namely "ok," "too_small," "too_large" and "much_too_large;" the wheel acceleration AW is represented with the linguistic values "too_neg," "normal" and "too_pos;" the locking pressure PL is represented by only two linguistic values, namely "is_small" and "is_large;" and for the pressure ratio ALR there exist only the linguistic values "very_large," "larger one," "one" and "small." The linguistic values are self-explanatory. In the consequence part, the output variable DP is given the linguistic values 100, 50, 10, 5, zero, m10, m20, m50, m100 and m300. The prefix "m" stands for "minus" and signifies a negative value in each case.

The rule base is preferably built up such that, firstly, depending on the value of the locking pressure PL, various blocks which are optimized to different roadway properties are addressed using fuzzy rules, and that, secondly, the positive pressure rate of change is lower the closer the pressure ratio ALR is to one.

In this antilock braking system, good and simple adaptability, for example on the basis of driving trials, is made possible by the fact that only the consequence parts in the rule base are changed, and the condition parts can remain.

I claim:

1. In an electromechanical vehicle braking system, a fuzzy-logic controlled antilock system, comprising:

a fuzzy controller adapted to form a braking-pressure rate of change; and a unit with integral behavior connected to said fuzzy controller, said unit with integral behavior utilizing the braking-pressure rate of change to output a nominal braking pressure as input variable for the vehicle braking system, and a signal connection between the vehicle braking system and an input upstream of said fuzzy controller whereby the vehicle braking system supplies an actual braking pressure as a comparative variable.

2. The antilock system according to claim 1, wherein said fuzzy controller is adapted to form the braking-pressure rate of change as a function of a wheel slip, a wheel acceleration, a locking pressure and a pressure ratio between a pressure selected from the group consisting of the actual braking pressure and a nominal pressure and the locking pressure.

3. The antilock system according to claim 2, which further comprises a unit for calculating the locking pressure, whereby the actual pressure is in each case stored as the locking pressure when the wheel slip exceeds a specific threshold value.

4. The antilock system according to claim 2, wherein said fuzzy controller has a rule base defining the positive pressure rate of change to be lower the closer the pressure ratio is to one.

5. The antilock system according to claim 2, wherein said fuzzy controller has a rule base defining the braking-pressure rate of change to depend only on the wheel acceleration and the pressure ratio, if the wheel slip is judged to be in order.

6. The antilock system according to claim 2, wherein said fuzzy controller has a rule base including:

definitions for the wheel slip consisting of the linguistic values "ok,", "too small," "too large," and "much too large";

definitions for the wheel acceleration consisting of the linguistic values "normal," "too negative" and "too positive";

definitions for the pressure ratio consisting of the linguistic values "one", "greater than one," "small," "large," and "very large"; and definitions for the locking pressure consisting of the linguistic values "small" and "large".

* * * * *